Figure 1:
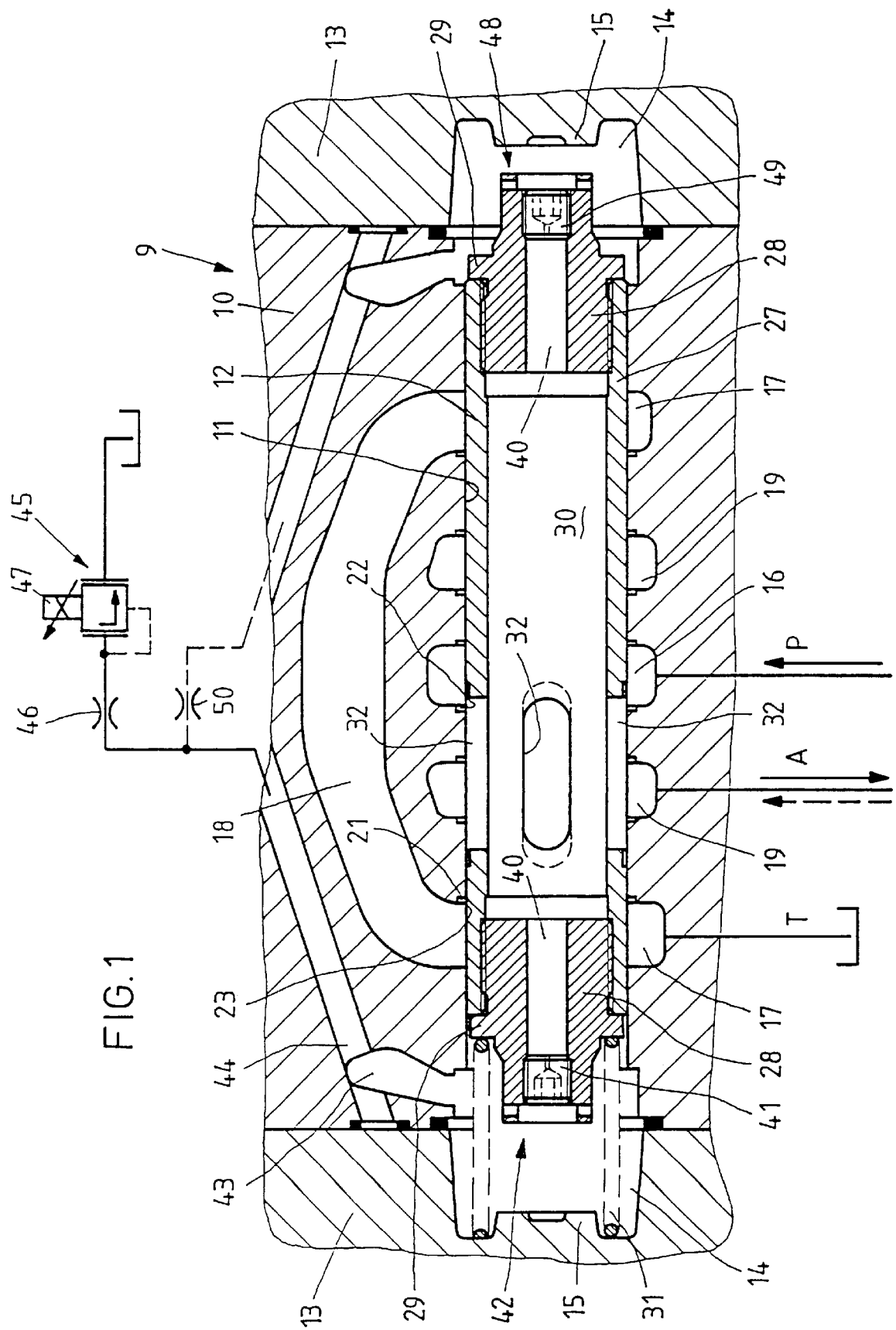

United States Patent
Machat et al.

[11] Patent Number: 6,095,177
[45] Date of Patent: Aug. 1, 2000

[54] PRECONTROLLED 3-WAY PRESSURE CONTROL VALVE

[75] Inventors: Götz-Dieter Machat, Lohr/Main; Karl-Josef Meyer, Rieneck; Wilfried Stroka, Partenstein; Jürgen Zügner, Rieneck, all of Germany

[73] Assignee: Mannesmann Rexroth AG, Lohr/Main, Germany

[21] Appl. No.: 09/155,730

[22] PCT Filed: Mar. 19, 1997

[86] PCT No.: PCT/EP97/01380

§ 371 Date: Oct. 2, 1998

§ 102(e) Date: Oct. 2, 1998

[87] PCT Pub. No.: WO97/40436

PCT Pub. Date: Oct. 30, 1997

[30] Foreign Application Priority Data

Apr. 20, 1996 [DE] Germany ............................ 196 15 789

[51] Int. Cl.[7] .................................................. G05D 7/00
[52] U.S. Cl. ..................................... 137/116.3; 137/115.23
[58] Field of Search ........................... 137/116.3, 115.23

[56] References Cited

U.S. PATENT DOCUMENTS

| | | |
|---|---|---|
| 4,321,941 | 3/1982 | Hunschede et al. . |
| 4,463,660 | 8/1984 | Mucheyer et al. . |
| 4,531,707 | 7/1985 | Dotti et al. . |
| 4,785,849 | 11/1988 | Masuda . |

FOREIGN PATENT DOCUMENTS

| | | |
|---|---|---|
| 0467128 | 1/1992 | European Pat. Off. . |
| 3204055 | 8/1983 | Germany . |
| 3218527 | 11/1983 | Germany . |
| 4422742 | 1/1996 | Germany . |

OTHER PUBLICATIONS

Grundlagen und Komponenten der Fluidtechnik Hydraulik, Hydraulics Trainer vol. 1, published by Mannesmann Rexroth GmbH, pp. 236 to 239, (RD 00290/10.91).

*Primary Examiner*—Gerald A. Michalsky
*Attorney, Agent, or Firm*—Martin A. Farber

[57] ABSTRACT

A precontrolled 3-way pressure control valve with a main valve having, in a valve housing, a valve bore with first, second and third control chambers connected with pressure connection, tank connection, and control connection, respectively, a control piston displaceable in a valve bore, wherein the third control chamber is connectable with the first or second control chambers, and subjectable in opposite direction to pressures from the control connection and pressure setting of a pilot valve. With deviation of pressure applied in control connection from pressure setting of the pilot valve, an imbalance of forces develops in the valve. Oblong holes, distributed over circumference of hollow control piston pass through the wall, are located in the wall radially delimiting its hollow chamber, which holes are longer than clearances between two control chambers. The hollow chamber is connected by a control nozzle on the control piston with a first pressure chamber in front of one end of the control piston, from which chamber a fluid connection leads to the pilot valve formed as a pressure-limiting valve. The control connection is connected with a second pressure chamber in front of other end of the control piston. The control piston is displaceable by pressure in the second pressure chamber against pressure in the first pressure chamber and against force of a spring arrangement by which the control piston is displaceable into position wherein the third control chamber is connected with the first control chamber, connecting the second and third control chambers.

20 Claims, 3 Drawing Sheets

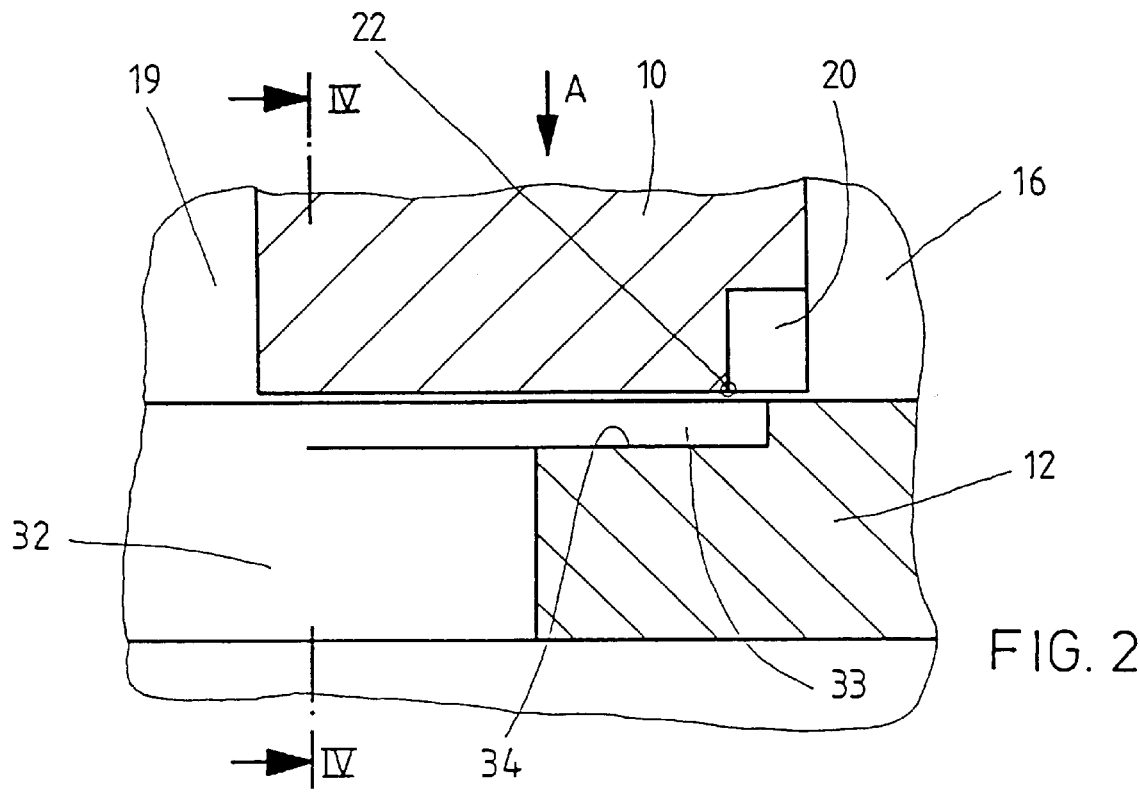
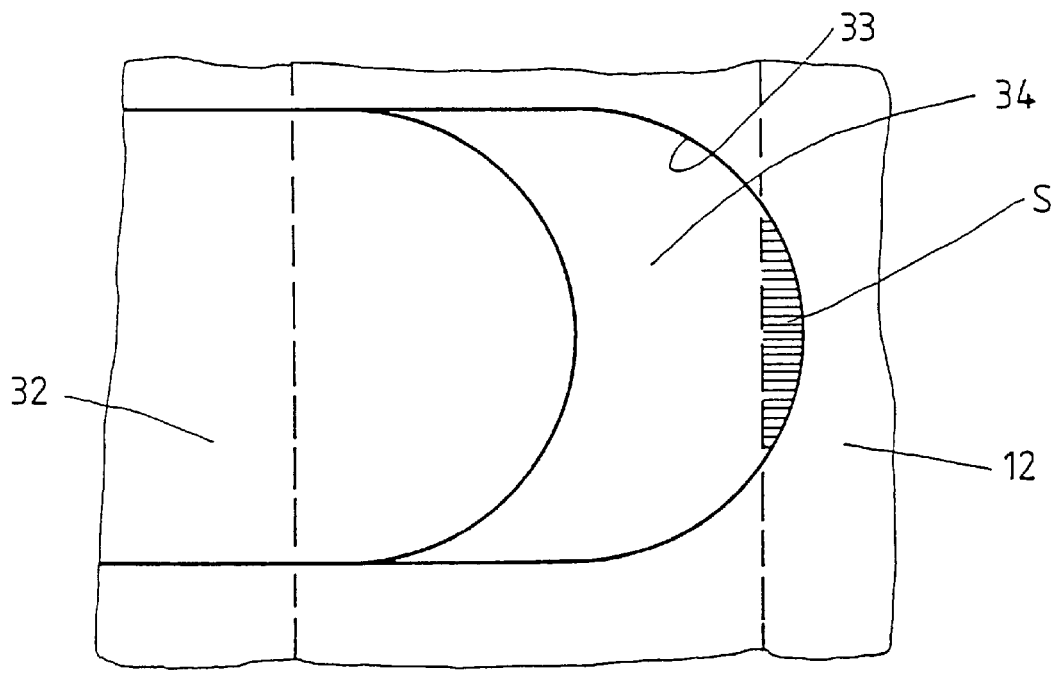
FIG. 3

PRECONTROLLED 3-WAY PRESSURE CONTROL VALVE

FIELD AND BACKGROUND OF THE INVENTION

The invention is based on a precontrolled 3-way pressure control valve.

A 3-way pressure control valve of kind is known from the book "Hydraulik Trainer Band 1" [Hydraulics Trainer Volume 1], published in 1991 by Mannesmann Rexroth GmbH, pages 236 to 239. In this pressure control valve, the main piston has a piston bead by which the middle control chamber can be sealed off from the first and second control chambers and which is abutted on either side by a piston neck from which control grooves distributed around the circumference extend into the piston bead. The control grooves that begin at a piston neck are located at an axial distance from the control grooves departing from the other piston neck, said distance being approximately equal to the axial extent of the middle control chamber.

The pilot valve of the known precontrolled pressure-regulating valve is a direct-controlled pressure-regulating valve with a pressure connection, a tank connection, and a control connection. The control connection is connected with a pressure chamber in front of one end of the main piston by fluid. Control oil from the pressure connection of the main valve flows to the pressure connection of the pilot valve. Depending on the adjustment of a spring, a certain pressure is set in the control connection of the pilot valve and hence in front of one end of the main piston. The middle control chamber of the valve bore of the main valve is connected by a housing channel with a pressure chamber in front of the other end of the main piston. In each case, a pressure becomes established in the middle control chamber and hence in the control connection such that an equilibrium exists at the main piston between the various pressure and spring forces. A precontrolled 3-way pressure control valve in which the pilot valve is supplied with the control oil from the pressure connection of the main valve is referred to as being high-pressure-controlled. The special advantage of this type of precontrol consists in the main piston not tightening even with a large volume flow and a large pressure differential between the pressure connection and the control connection of the main valve, i.e. the connection between the pressure connection and the control connection is interrupted by the main piston and hence the applicability of the valve is limited. It is disadvantageous that the known precontrolled pressure control valve has a tendency toward instability under certain operating conditions, in other words pressure fluctuations occur at the control connection.

SUMMARY OF THE INVENTION

The object of the invention, with a valve of the above-mentioned type, is to provide precontrolled, 3-way pressure control valve that exhibits very stable behavior and does not tighten in response to large volume flows with a high pressure differential between the pressure connection and the control connection.

The 3-way pressure control valve according to the invention is low-pressure-controlled, since the control oil is supplied to the pilot valve, designed as a pressure-limiting valve, not from the pressure connection but from the control connection and/or from an area of the valve in which the regulating pressure prevails. The stability of the pressure-control valve is considerably improved by this type of control oil removal and by the type of pilot valve.

For a general understanding of a precontrolled 3-way pressure control valve it is sufficient to assume that in all the chambers of the valve openly connected with the control connection, the same static pressure prevails, namely the control pressure. On closer examination, however, it becomes evident that there are local deviations from the control pressure everywhere, caused by the geometry of the main piston and the hollow chambers in the valve housing, and that therefore the geometry and the point at which the control oil flowing to the pilot valve is removed influence the function of the pressure control valve. In a precontrolled 3-way pressure control valve according to the invention, it is now possible, as a result of the special nature of the main piston and by the way in which control oil is supplied from the control pressure area, into the first pressure chamber located in front of one end of the main piston, which can also be referred to as the control piston, to avoid tightening of the valve even with high-volume flows and high pressure differentials between the pressure connection and the control connection.

An advantageous embodiment is the control piston with regard to the hollow chamber in it and in regard to the oblong holes that form a connection between the outer circumference of the control piston and the hollow chamber. Other features of the invention relate primarily to the way in which the two pressure chambers in front of the ends of the control piston are connected with the control connection and with the pilot valve.

In conjunction with the formation of the oblong holes, it has proven to be especially advantageous where the oblong holes are shorter than the clearance between the first control chamber and the second control chamber and where a precision control pocket that is closed radially inwardly axially adjoins each oblong hole on one side, with the total length of a portion of the control piston containing an oblong hole and at least one precision control pocket being approximately equal to the clearance between the first control chamber and the second control chamber. Preferably the total length of the portion is slightly greater than the clearance between the two control chambers mentioned above. The transient response of the pressure control valve during changes in the guide valve, in other words the control pressure setpoint, is influenced positively by the precision control pocket. The control pressure setpoint is specified by the setting of the pilot valve. If this valve is a pressure-limiting valve that can be controlled proportionately, for example with the aid of an electromagnet, the control pressure setpoint can be changed rapidly. If the total length of the oblong hole and the precision control pocket is slightly greater than the clearance between the first control chamber and the second control chamber, one speaks of a negative overlap of the control edges on the control piston and on the first and second control chambers. In one position of the control piston in which no significant volume flow from either the pressure connection to the control connection or from the control connection to the tank connection is present, a leaking oil stream constantly flows from the control connection to the tank connection which must be compensated by the pressure connection. However, undesired periodic pressure fluctuations in the control connection are then avoided by the negative overlap of the control edges.

Preferably, a precision control pocket adjoins each oblong hole axially on both sides. It is basically possible to design the two precision control pockets differently at an oblong hole with regard to their length, depth, or their width. Preferably however the two precision control pockets on either side of an oblong hole are of equal size.

According to the invention, the control oil flows to the first pressure chamber from the hollow chamber of the control piston through an internal fluid connection in the control piston. Preferably, the connection of the control connection is linked with the second pressure chamber in front of the other end of the control piston, from the hollow chamber of the control piston takes place through the control piston.

With an arrangement of damping nozzles in accordance with a feature of the invention, the behavior of the valve can be influenced. In particular, a nozzle between the second pressure chamber and the first pressure chamber or the pilot valve has a favorable effect on the transient response of the pressure control valve.

An embodiment of a precontrolled 3-way pressure control valve according to the invention as well as two types of precontrol are shown in the drawings. The invention will now be described in greater detail with reference to the figures of these drawings.

Figure 4:
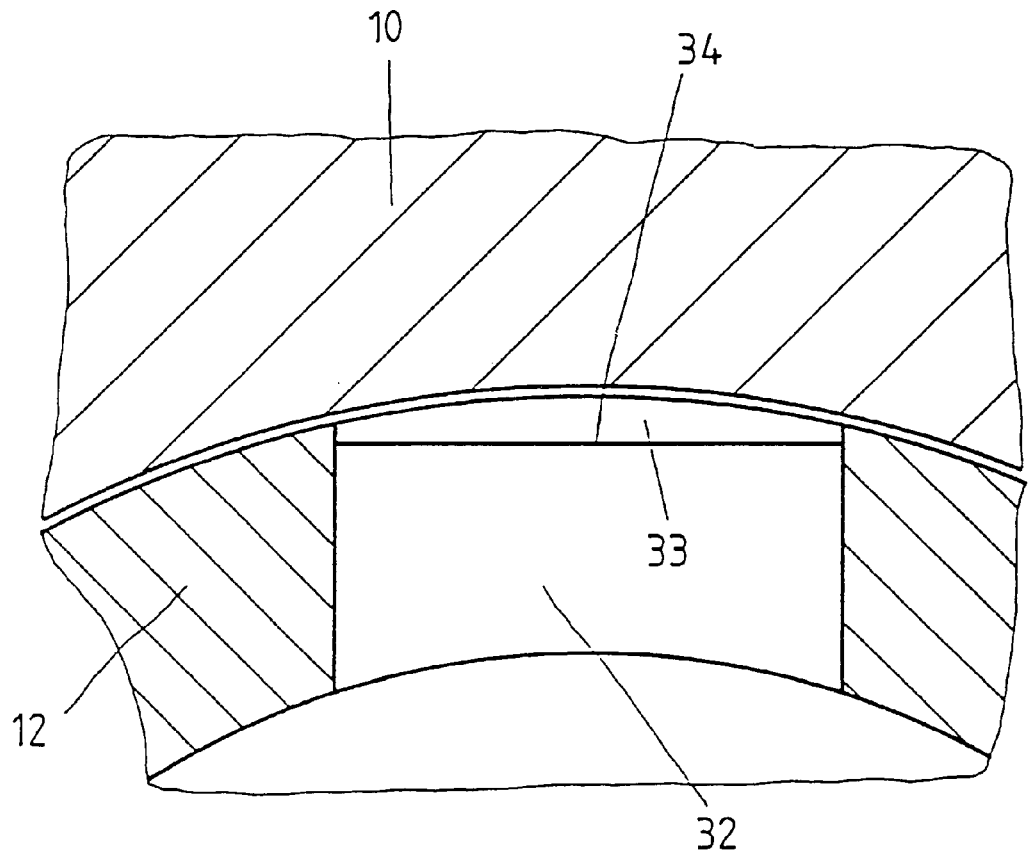
Figure 5:
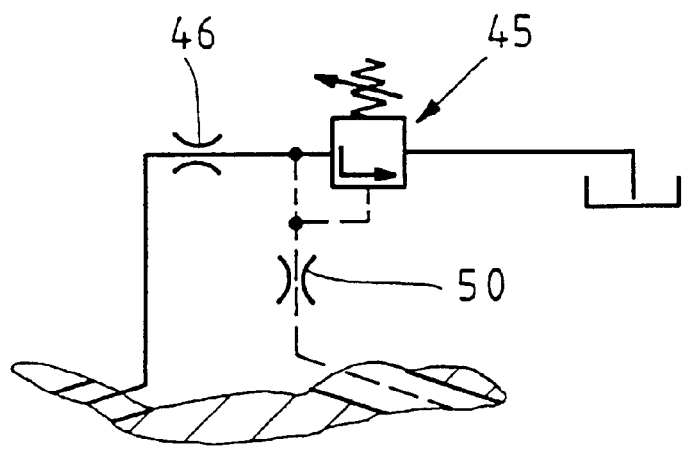

It shows:

FIG. 1 a partial lengthwise section through the embodiment with a first type of precontrol, FIG. 2 an enlarged portion of FIG. 1 with a slightly different position of the control piston, FIG. 3 is a top view of the control piston as viewed in the direction of arrow A in FIG. 2, FIG. 4 a section along line IV—IV in FIG. 2 and FIG. 5 a schematic view of a second type of precontrol.

The precontrolled 3-way pressure control valve according to FIG. 1 has a through valve bore 11 in a valve housing 10 of its main valve 9, in which bore a main piston 12 is axially displaceable as a control piston. Valve bore 11 is sealed on both sides by covers 13 that are screwed to the valve housing 10 and have a recess 14 with a central elevation 15 in extension of the valve bore.

Valve bore 11, at several places that are spaced axially from one another, is widened into control chambers in the form of annular channels. A first control chamber 16 is located in the center of valve bore 11 and is connected with a pressure connection P of the main valve 9. At a greater distance from the first control chamber 16 there are two second control chambers 17 connected with one another by a bridge channel 18 and also with a tank connection T of the main valve 9. Between the control chamber 16 and each control chamber 17, a third control chamber 19 is located, of which only one is used as a control connection A of the valve. The other control chamber 19 is sealed off from the outside. In addition, only one of the two control chambers 17 is used, namely the one which, as viewed from the first control chamber 16, is located beyond the third control chamber 19 that is used. The two superfluous control chambers 17 and 19 are present because, for cost reasons, the same valve housing is used as for the precontrolled 4/3-way valves that are manufactured in large numbers. When reference is made in the following to a control chamber, this is to be understood to mean a control chamber that is used.

Sharp control edges 22 and 23 are formed, at least on control chamber 16 and on control chamber 17, by undercuts 20 and 21 on the axial lateral surfaces that face away from one another, the edges being located at a predetermined distance from one another.

Control piston 12 comprises essentially three parts, namely a tube 27 as well as two sealing pieces 28 that are screwed inward from the two ends of tube 27 until they contact a flange 29 on the respective end of tube 27. Viewed as a whole, control piston 12 is therefore a hollow piston with a hollow chamber 30 that extends axially between the two sealing pieces 28. The ratio between the diameter of hollow chamber 30 and the outside diameter of control piston 12 is approximately 0.75. A coil compression spring 31 is located between the flange 29 of one sealing piece 28 and one cover 13, the spring urging the control piston against the other cover 13.

Hollow chamber 30 is open to the outside of the control piston 12 through four oblong holes 32 that extend in the axial direction, the holes being distributed at equal angle intervals around the circumference of the control piston. The oblong holes 32 terminate axially in an arc with a radius that has half the width of an oblong hole. Oblong holes 32 are shorter than the distance between the control edges 22 and 23 and longer than the spacing at the center between the two control chambers 16 and 19. They are in an area of control piston 12 such that when the control piston, as seen in FIG. 1, abuts the right-hand cover 13, the control chambers 16 overlap axially approximately halfway and the control chambers 19 overlap completely. Hollow chamber 30 is much longer than the oblong holes 32 and extends on both sides far beyond oblong holes 32.

On both sides, each oblong hole is adjoined in the axial direction by a fine control pocket 33, which is delimited radially internally by a plane bottom 34. The two fine control pockets 33 on either side of an oblong hole 32 are made identical to one another. They have the same radial depth, the same width, namely the width of oblong hole 32, and are delimited axially by an arc whose radius is equal to half the width of the oblong hole and the fine control pockets. The length of each fine control pocket 33 is only a sixth to a seventh of the length of an oblong hole 32. The total length of an oblong hole 32 and the two fine control pockets 33 associated with an oblong hole is slightly greater than the distance between the two control edges 22 and 23. Between these control edges on valve housing 10 and oblong holes 32 including the fine control pockets 33, there is therefore a negative overlap. This is evident in particular from FIGS. 2 and 3 in which oblong holes 32 assume a central position relative to control edges 22 and 23 of valve housing 10, in which an opening cross section designated by S and shaded horizontally in FIG. 3 exists between the fine control pockets 33 and control edges 22 and 23.

The two sealing pieces 28 are traversed centrally by an axial bore 40 whose diameter is much smaller than the diameter of hollow chamber 30. A first pressure chamber 42 that is located in front of the end of control piston 12 that is subjected to the action of coil compression spring 31 is fluidly connected with hollow chamber 30 by axial bore 40 in one sealing piece 28 and by a replaceable control nozzle 41, which is located in the axial bore at a distance from hollow chamber 30. By means of cast and drilled channels 43 and 44 in valve housing 10, there is a fluid connection from pressure chamber 42 to the pilot valve 45 designed as a proportional pressure-limiting valve. A damping nozzle 46 is also located in the fluid connection, but is not required for the basic function of the pressure-regulating valve. The setting of the pilot valve 45 can be changed by a proportional electromagnet 47. Depending on the level of the current flowing through electromagnet 47, pilot valve 45 opens when there is a different pressure at its input.

A second pressure chamber 48 that is located from the other end of control piston 12 is connected with hollow chamber 30 through axial bore 40 of the other sealing piece 28, with it being possible to provide a preferably replaceable damping nozzle 49 in this connection. There is no need as such for additional connections to second pressure chamber 48. In the embodiment according to FIG. 1, however, the second pressure chamber 48 is connected by channels that correspond to channels 43 and 44 and a damping nozzle 50 located therein with the first pressure chamber 42.

In the alternative precontrol according to FIG. 5, the pressure-limiting valve 45 can be adjusted manually to various values. Damping nozzle 50 is not located between the second pressure chamber and the first pressure chamber, but between the second pressure chamber and pilot valve 45.

In the normal design of a precontrolled 3-way pressure control valve according to the invention, two nozzles 41 and 46 are used that have the same opening cross section. The connection between hollow chamber 30 and second pressure chamber 48 is open, in other words nozzle 49 is not inserted. The connection between the second pressure chamber 48 and the first pressure chamber or the pilot valve is closed by a plug.

With the aid of the 3-way pressure control valve shown, a pressure that can be predetermined by the setting of the pilot valve is maintained in control connection A. In this way, a distinction is made between a pressure-reducing function in which, to maintain the pressure in control c-connection A, pressure medium from pressure connection P must be supplied to the control connection A and a pressure-limiting function in which, to maintain the pressure in control connection A, pressure medium must flow out of connection A to tank connection T, and a pressure-maintaining function in which the volume flow is essentially zero and only a volume flow of leaking oil is replaced.

In an initial position of the valve, control piston 12 is pressed by compression spring 31 against one cover 13. The connection between control chambers 16 and 19, in other words between pressure connection P and control connection A, is fully open. When a volume flow is flowing from pressure connection P to control connection A, this flow builds up a pressure in control connection A. This pressure acts through oblong holes 32, hollow chamber 30, and axial bore 40 in one sealing piece 28 and the control nozzle 41 in the first pressure chamber 42 and through the other sealing piece 28 in second pressure chamber 48 as well. The maximum opening cross section between pressure connection P and control connection A remains initially until the pressure in control connection A reaches the value set on pilot valve 45. Pilot valve 45 opens and a control volume flow begins to flow to the tank from hollow chamber 30 through control nozzle 41, first pressure chamber 42, channels 43 and 44, as well as damping nozzle 46 and the open control cross section of the pressure-limiting valve 45. When the control volume flow is so great that the critical pressure drop at control nozzle 41 that corresponds to the pretensioning force of compression spring 31 based on the cross-sectional area of control piston 12 subjected to the pressure is exceeded at approximately 2 bars for example, control piston 12, as seen in FIG. 1, moves to the left and throttles the connection from pressure connection P to control connection A until a new equilibrium of forces is established at control piston 12. The pressure determined by the setting of pilot valve 45 in control connection A is largely independent of the volume flow from P to A and is maintained largely independently of the pressure level in P. Of course it is assumed that the pressure differential between P and A is at least as great as the through-flow resistance of the valve for the volume flow in question.

If the pressure in A, under the influence of external forces, for example on a cylinder, exceeds the value set by pilot valve 45, this pressure acts in the second pressure chamber 48 and displaces control piston 12 to the point where the connection from A to T at control edge 23 and the corresponding precision control edges is opened. Then, largely independently of the volume flow from A to T, the pressure in A is kept constant to correspond to the value set on pilot valve 45. Connection P is blocked in the course of this pressure-limiting function of the valve.

When no volume flow is required in connection A, for example when a hydraulic cylinder or a hydraulic motor is at rest, the valve operates in a pressure maintenance function. Control piston 12 is displaced from its starting position sufficiently far to the left that the control cross section at control edge 22 of valve housing 10 remains open only so far that the control oil volume flow required for pressure regulation is maintained, possible leaking oil losses in A are compensated, and a leaking oil flow from A to T that may be present because of the negative overlap is replaced.

What is claimed is:

1. Precontrolled 3-way pressure control valve with a directly controlled pressure valve (45) as a pilot valve, with a main valve (9) that has, in a valve housing (10), a valve bore (11) with a first control chamber (16) connected with a pressure connection (P), with a second control chamber (17) connected with a tank connection (T), and with a third central control chamber (19) connected with a control connection (A) as well as a control piston (12) displaceable in valve bore (11), by which the third control chamber (19) can be connected with the first control chamber (16) or with the second control chamber (17), and can be subjected in the opposite direction to the pressures that are derived from the pressure in control connection (A) and from the pressure setting of pilot valve so that, with a deviation of the pressure applied in control connection (A) from the control pressure specified by the pressure setting of the pilot valve (45), an imbalance of forces develops in said valve, wherein the control piston (12) is formed as a hollow piston with a hollow chamber (30), a plurality of oblong holes (32) that are distributed over the circumference of the control piston (12), pass through the wall, and run axially, are located in the wall that radially delimits the hollow chamber (30), which holes being longer than the clearances between two control chambers (16, 19; 17, 19), the hollow chamber (30) of the control piston (12) is connected by a control nozzle (41) on control piston (12) with a first pressure chamber (42) that is located in front of one end of control piston (12), from which chamber a fluid connection leads to the pilot valve that is formed as a pressure-limiting valve (45), the control connection (A) is connected with a second pressure chamber (48) located in front of the other end of the control piston (12), and the control piston (12) is displaceable by the pressure in the second pressure chamber (48) against the pressure in the first pressure chamber (42) and against the force of a spring arrangement (31) by which the control piston (12) can be displaced into a position in which the third control chamber (19) is connected with the first control chamber (16), connecting the third control chamber (19) with the second control chamber (17).

2. Precontrolled 3-way pressure control valve according to claim 1, wherein the hollow chamber (30) is substantially longer on both sides than oblong holes (32).

3. Precontrolled 3-way pressure control valve according to claim 1, wherein the ratio between the diameter of the hollow chamber (30) and the outside diameter of the control piston (12) is between 0.7 and 0.8.

4. Precontrolled 3-way pressure control valve according to claim 1, wherein the length of an oblong hole (32) is at least as great as the central spacing between two control chambers (16, 19; 17, 19).

5. Precontrolled 3-way pressure control valve according to claim 1, wherein the length of oblong holes (32) is less than the clearance between the first control chamber (16) and the second control chamber (17), a radially internally closed fine control pocket (33) axially adjoins each oblong hole (32) at least on one side, and the total length of a portion of the control piston (12) that has an oblong hole (32) and at least one fine control pocket (33) is approximately equal to the clearance between the first control chamber (16) and the second control chamber (17).

6. Precontrolled 3-way pressure control valve according to claim 5, wherein a fine control pocket (33) adjoining an oblong hole (32) has the same width as the oblong hole (32).

7. Precontrolled 3-way pressure control valve according to claim 5, wherein a fine control pocket (33) closes with an arc whose radius is equal to half the width of the fine control pocket (33).

8. Precontrolled 3-way pressure control valve according to claim 5, wherein a fine control pocket (33) adjoins each oblong hole (32) axially on both sides.

9. Precontrolled 3-way pressure control valve according to claim 8, wherein the two fine control pockets (33) on both sides of an oblong hole (32) are the same.

10. Precontrolled 3-way pressure control valve according to claim 9, wherein an oblong hole (32) is approximately six to seven times as long as a fine control pocket (33).

11. Precontrolled 3-way pressure control valve according to claim 8, wherein the two fine control pockets (33) on both sides of an oblong hole (32) differ from one another.

12. Precontrolled 3-way pressure control valve according to claim 1, wherein an axial bore (40) with a diameter smaller than that of the hollow chamber (30) runs between the control nozzle (41) and the hollow chamber (30).

13. Precontrolled 3-way pressure control valve according to claim 1, wherein the connection of the control connection (A) with the second pressure chamber (48) from the hollow chamber (30) of control piston (12) occurs through the control piston (12).

14. Precontrolled 3-way pressure control valve according to claim 13, wherein an axial bore (40) runs from hollow chamber (30) in the direction of second pressure chamber (48) and is narrower than hollow chamber (30).

15. Precontrolled 3-way pressure control valve according to claim 1, wherein a damping nozzle (49) is connected in front of the second pressure chamber (48) toward the control connection (A).

16. Precontrolled 3-way pressure control valve according to claim 1, wherein the first pressure chamber (42) is connected fluidly with the pilot valve (45) by a damping nozzle (46).

17. Precontrolled 3-way pressure control valve according to claim 1, wherein the second pressure chamber (48) is connected by a damping nozzle (50) with the first pressure chamber (42) or with the pilot valve (45).

18. Precontrolled 3-way pressure control valve according to claim 1, wherein the length of an oblong hole (32) is at least as great as the central spacing between two control chambers (16, 19, 17, 19), and the length of oblong holes (32) is less than the clearance between the first control chamber (16) and the second control chamber (17), a radially internally closed fine control pocket (33) axially adjoins each oblong hole (32) on both sides, and the total length of a portion of the control piston (12) that has an oblong hole (32) and two fine control pockets (33) is approximately equal to the clearance between the first control chamber (16) and the second control chamber (17).

19. Precontrolled 3-way pressure control valve according to claim 18, wherein a fine control pocket (33) adjoining an oblong hole (32) has the same width as the oblong hole (32).

20. Precontrolled 3-way pressure control valve according to claim 19, wherein a fine control pocket (33) closes with an arc whose radius is equal to half the width of the fine control pocket (33).

* * * * *